United States Patent
Wren

(10) Patent No.: US 10,703,132 B2
(45) Date of Patent: Jul. 7, 2020

(54) WHEEL COVER

(71) Applicant: Consolidated Metco, Inc., Vancouver, WA (US)

(72) Inventor: Jonathan Wren, Vancouver, WA (US)

(73) Assignee: Consolidated Metco, Inc., Vancouver, WA (US)

(*) Notice: Subject to any disclaimer, the term of this patent is extended or adjusted under 35 U.S.C. 154(b) by 0 days.

(21) Appl. No.: 15/712,740

(22) Filed: Sep. 22, 2017

(65) Prior Publication Data

US 2019/0092089 A1 Mar. 28, 2019

(51) Int. Cl.
*B60B 7/06* (2006.01)
*B60B 7/04* (2006.01)

(52) U.S. Cl.
CPC .............. *B60B 7/066* (2013.01); *B60B 7/04* (2013.01)

(58) Field of Classification Search
CPC .......... B60B 7/066; B60B 7/04; B60B 7/0013
USPC .................................................. 301/37.102
See application file for complete search history.

(56) References Cited

U.S. PATENT DOCUMENTS

| | | | |
|---|---|---|---|
| 1,722,783 A | 7/1929 | Basseches | |
| 1,871,144 A | 8/1932 | Wilczynski | |
| 2,432,531 A | 12/1947 | Lyon | |
| 2,440,805 A | 5/1948 | Lyon | |
| 2,526,026 A | 10/1950 | Horn | |
| 2,639,948 A | 5/1953 | Grimshaw | |
| 2,650,135 A | 8/1953 | Lyon | |
| 2,794,684 A | 6/1957 | Lyon | |
| 2,869,929 A | 1/1959 | Hurd | |
| 3,078,124 A | 2/1963 | Mulder | |
| 3,092,420 A | 6/1963 | Baldwin | |

(Continued)

FOREIGN PATENT DOCUMENTS

| | | |
|---|---|---|
| EP | 0200812 | 11/1986 |
| EP | 0300538 | 1/1989 |

(Continued)

OTHER PUBLICATIONS

International Search Report and Written Opinion in corresponding International Application No. PCT/US18/50408, dated Nov. 19, 2018, 8 pages.

(Continued)

*Primary Examiner* — S. Joseph Morano
*Assistant Examiner* — Jean W Charleston
(74) *Attorney, Agent, or Firm* — Fitch, Even, Tabin & Flannery LLP

(57) ABSTRACT

A wheel cover assembly has a mounting ring, an outer wheel cover, and an inner wheel locking structure. The mounting ring attaches to a vehicle wheel hub via latch mechanisms that latch over an axle flange of the wheel hub. The outer wheel cover has axially-inwardly-extending latches that secure the outer wheel cover to the mounting ring. The inner wheel locking structure includes axially-inwardly-extending latches that pass through openings in the outer wheel cover, securing the outer wheel cover to the mounting ring. The inner locking structure includes latches that pass through openings in the outer wheel cover. This inner locking structure includes locking pins that extend into the locking ring to lock the wheel cover latches to the mounting ring. A pair of inner locking faces on the inner locking structure lock the mounting ring latches to the wheel hub.

19 Claims, 4 Drawing Sheets

(56) References Cited

U.S. PATENT DOCUMENTS

| | | | |
|---|---|---|---|
| 3,317,247 A | 5/1967 | Lamme | |
| 3,356,421 A | 12/1967 | Trevarrow, Jr. | |
| 3,367,722 A | 2/1968 | Miyanaga | |
| 3,515,196 A | 6/1970 | Floria | |
| 3,532,384 A | 10/1970 | Williams, Jr. | |
| 3,585,824 A | 6/1971 | Schenk | |
| 3,724,905 A | 4/1973 | Kachler | |
| 3,860,297 A | 1/1975 | Solis | |
| 3,918,764 A | 11/1975 | Lamme | |
| 3,939,894 A | 2/1976 | Curtis | |
| 3,988,039 A | 10/1976 | Spisak | |
| 4,064,923 A | 12/1977 | German | |
| 4,261,621 A | 4/1981 | Fox | |
| 4,333,688 A | 6/1982 | Lemmon | |
| 4,593,953 A | 6/1986 | Baba | |
| 4,725,100 A | 2/1988 | Patti | |
| 4,730,952 A | 3/1988 | Wiley | |
| 4,761,040 A | 8/1988 | Johnson | |
| 4,842,339 A | 6/1989 | Roulinson | |
| 4,889,394 A | 12/1989 | Ruspa | |
| 4,895,415 A | 1/1990 | Stay | |
| 4,971,396 A | 11/1990 | Morris | |
| 4,974,909 A | 12/1990 | Patti | |
| 4,984,851 A | 1/1991 | Hayano | |
| 5,042,881 A | 8/1991 | Polka | |
| 5,046,784 A * | 9/1991 | Carter, III | B60B 7/10 |
| | | | 301/37.36 |
| 5,061,014 A | 10/1991 | Polka | |
| 5,167,440 A | 12/1992 | Fitzgerald | |
| 5,222,785 A | 6/1993 | Green | |
| 5,263,770 A | 11/1993 | Goudey | |
| 5,294,189 A | 3/1994 | Price | |
| 5,358,313 A | 10/1994 | Polka | |
| 5,366,278 A | 11/1994 | Brumfield | |
| 5,366,279 A | 11/1994 | Polka | |
| 5,443,582 A | 8/1995 | Ching | |
| RE35,497 E | 4/1997 | Carter, III | |
| 5,630,653 A | 5/1997 | Polka | |
| 5,770,797 A | 6/1998 | Lapohn | |
| 5,795,035 A | 8/1998 | Fuller | |
| 5,823,635 A | 10/1998 | Polka | |
| 5,871,335 A | 2/1999 | Bartlett | |
| 6,045,195 A | 4/2000 | Okamoto | |
| 6,105,645 A | 8/2000 | Ingram | |
| 6,120,104 A | 9/2000 | Okamoto | |
| 6,152,537 A | 11/2000 | Wright | |
| 6,189,977 B1 | 2/2001 | Kennedy | |
| 6,325,124 B1 | 12/2001 | Colussi | |
| 6,378,954 B1 | 4/2002 | Polka | |
| 6,378,955 B1 | 4/2002 | Adamson | |
| 6,386,642 B2 | 5/2002 | Maloney | |
| 6,409,277 B2 | 6/2002 | Nunes | |
| 6,443,528 B1 | 9/2002 | Polka | |
| 6,467,852 B1 | 10/2002 | Polka | |
| 6,595,596 B1 | 7/2003 | Polka | |
| 6,682,151 B1 | 1/2004 | Van Houten | |
| 6,705,369 B1 | 3/2004 | Russell | |
| 6,820,475 B2 | 11/2004 | Wallach | |
| 6,857,709 B1 | 2/2005 | McLean | |
| 6,983,998 B2 | 1/2006 | Litzka | |
| 7,059,684 B1 | 6/2006 | Polka | |
| 7,081,081 B2 | 7/2006 | Schutz | |
| 7,131,705 B1 | 11/2006 | Delvecchio | |
| 7,218,210 B2 | 5/2007 | Schoenberger | |
| 7,344,198 B1 | 3/2008 | Dohm | |
| 7,484,736 B2 | 2/2009 | Allemann | |
| 7,547,076 B2 | 6/2009 | Necaise | |
| 7,677,677 B1 | 3/2010 | Roberts | |
| 7,775,604 B2 | 8/2010 | Chen | |
| 8,011,848 B2 | 9/2011 | Sockman | |
| 8,382,210 B1 | 2/2013 | Fleck | |
| 8,727,452 B2 * | 5/2014 | Merten | B60B 7/0026 |
| | | | 301/37.102 |
| 9,321,302 B2 | 4/2016 | Fleck | |
| 9,327,550 B2 | 5/2016 | Butler | |
| 9,365,074 B2 | 6/2016 | Polka | |
| 9,561,687 B2 | 2/2017 | Polka | |
| 9,821,598 B2 | 11/2017 | Fleck | |
| 10,343,450 B2 | 7/2019 | Butler | |
| 2003/0038529 A1 | 2/2003 | Hsu | |
| 2003/0047987 A1* | 3/2003 | Enomoto | B60B 1/08 |
| | | | 301/37.101 |
| 2005/0199328 A1 | 9/2005 | Schoenberger | |
| 2009/0224597 A1 | 9/2009 | Wood | |
| 2011/0089748 A1 | 4/2011 | Grill | |
| 2011/0101767 A1 | 5/2011 | Fleck | |
| 2012/0043803 A1 | 2/2012 | Grill | |
| 2012/0181849 A1 | 7/2012 | Rogers | |
| 2013/0015698 A1 | 1/2013 | Butler | |
| 2013/0069422 A1* | 3/2013 | Li | B60B 1/06 |
| | | | 301/104 |
| 2013/0076107 A1 | 3/2013 | Starnes | |
| 2013/0207447 A1 | 8/2013 | De Lima | |
| 2013/0334869 A1* | 12/2013 | Kronemeyer | B60B 7/06 |
| | | | 301/37.102 |
| 2014/0152079 A1* | 6/2014 | Vickers | B60B 7/08 |
| | | | 301/37.102 |
| 2014/0159469 A1* | 6/2014 | Chinavare | B60B 3/10 |
| | | | 301/37.102 |
| 2014/0265533 A1 | 9/2014 | Polka | |
| 2014/0284994 A1 | 9/2014 | Polka | |
| 2017/0157979 A1 | 6/2017 | Polka | |
| 2017/0341463 A1 | 11/2017 | Takeda | |
| 2019/0270335 A1 | 9/2019 | Butler | |

FOREIGN PATENT DOCUMENTS

| | | |
|---|---|---|
| WO | 2008100338 | 8/2008 |
| WO | 2018136529 | 7/2018 |

OTHER PUBLICATIONS

U.S. Appl. No. 62/812,737, filed Mar. 1, 2019 (34 pages).

AeroTech Caps Installation Video, https://www.youtube.com/watch?v=wHtH1yfsRXc, posted Feb. 10, 2014, 8 pages.

Deflecktor aerodynamic wheel cover 2017, https://www.youtube.com/watch?v=ESQFIBlocTY&I=34s, posted Oct. 17, 2017, of Deflecktor aerodynamic wheel cover believed to be publicly available before Sep. 22, 2017, 7 pages.

FlowBelow Aero Inc., Tractor AeroKit product guide printed from Wayback Machine https://web.archive.org/web/20170902023134/https://www.flowbelow.com/aerokit dated Sep. 2, 2017; 6 pages.

RealWheels Corporation, Twist & Lock™ Aero Covers product guide printed from Wayback Machine https://web.archive.org/web/20170209214634/https://www.realwheels.com/product/twist-lock-aero-covers/ dated Feb. 9, 2017; 7 pages.

U.S. Appl. No. 16/800.335, entitled Wheel Cover, filed Feb. 25, 2020, 59 pages.

* cited by examiner

WHEEL COVER

TECHNICAL FIELD

This application relates generally to a commercial vehicle wheel cover, and more particularly to a wheel cover with an attachment system that allows ready installation and removal of the wheel cover, yet with secure fitting.

BACKGROUND

The described wheel covers are applicable to commercial vehicles, for example trucks, trailers, and buses. A wheel cover is used create a more aerodynamic shape on commercial vehicles, by filling the void or indentation created by the rims of the wheels. The wheel covers can be installed manually by a mechanic, a truck driver, or another person, and generally take a significant amount of time to complete installation on all the wheels of a commercial vehicle.

Some wheel covers currently used in the commercial vehicle industry are difficult and time consuming to install. Installation often requires special hardware, mounting bracketry and tools and does not typically allow easy ways for pre-trip inspection. After the wheel covers are installed, an operator will likely have to completely uninstall the wheel covers to comply with the pre-trip inspection laws requiring the operator to inspect the hubs and wheels prior to every trip.

SUMMARY

This application describes a commercial vehicle wheel cover. The described wheel covers allow for a tool-free installation process and further can be easily detached for inspection purposes.

One embodiment of the present commercial vehicle wheel cover includes a wheel cover assembly having a mounting ring, an outer wheel cover, an inner wheel latching cover and an inner wheel cover. The inner wheel latching cover is attached to the inner wheel cover, together defining an inner wheel locking structure. The inner wheel locking structure is radially attached to the outer wheel cover, together defining a wheel disc structure. The wheel cover assembly has an axial outer side and an axial inner side.

The axial inner side of the wheel cover assembly is adjacent a wheel hub. The wheel cover assembly-mounting ring is attached to the wheel hub via at least two latch mechanisms which latch over an axle flange of the wheel hub, thereby securing the wheel cover assembly mounting ring in an initial latching step. Each latch mechanism includes a radially outward locking face. The wheel disc structure is positioned adjacent the mounting ring, with the wheel disc structure having at least two axially-inwardly-extending latches that pass inside receiving cups and latch through receiving openings in the mounting ring. Each of the axially-inwardly-extending latches have a radially shallow engagement lip that secures lightly to the mounting ring in a first securing step.

The inner locking structure includes at least two axially-outwardly-extending first latches that pass through first openings in the outer wheel cover to axially secure the inner locking structure to the outer wheel cover. Each first latch includes a radially-inward locking face. The inner locking structure also includes at least two second latches that extend inwardly through second openings in the outer wheel cover. The inner locking structure second latches also include axially-inward-extending lips. The inner locking structure also includes a plurality of locking pins. The locking pins pass inside the mounting ring receiving cups, radially contacting the mounting ring receiving cups and the outer wheel axially inwardly extending latches, thusly securing the wheel disc structure to the mounting ring in a first locking step. The inner locking structure axially outwardly extending first cover latches contact the mounting ring latch mechanisms, by way of the radially outward and radially inward locking faces, thusly securing the mounting ring to the wheel hub in a secondary securing step.

In some examples, the described wheel covers can be used as a commercial vehicle wheel cover that improves the overall aerodynamic shape of a vehicle. In some examples, the commercial vehicle wheel covers can be relatively simple to install and can be installed and removed by a user in a relatively short time frame as compared to that of the installation of other wheel covers. In still more examples, the described commercial vehicle wheel covers can be easily removed to provide a user with access to the hub and tire so that the user can perform the pre-trip inspection, which in some instances, may be required by law. Further, the described commercial vehicle wheel covers may include an attachment assembly featuring two or more cover pieces fastened together to the hub axle flange via one or more latch assemblies.

DETAILED DESCRIPTION

Figure 1:
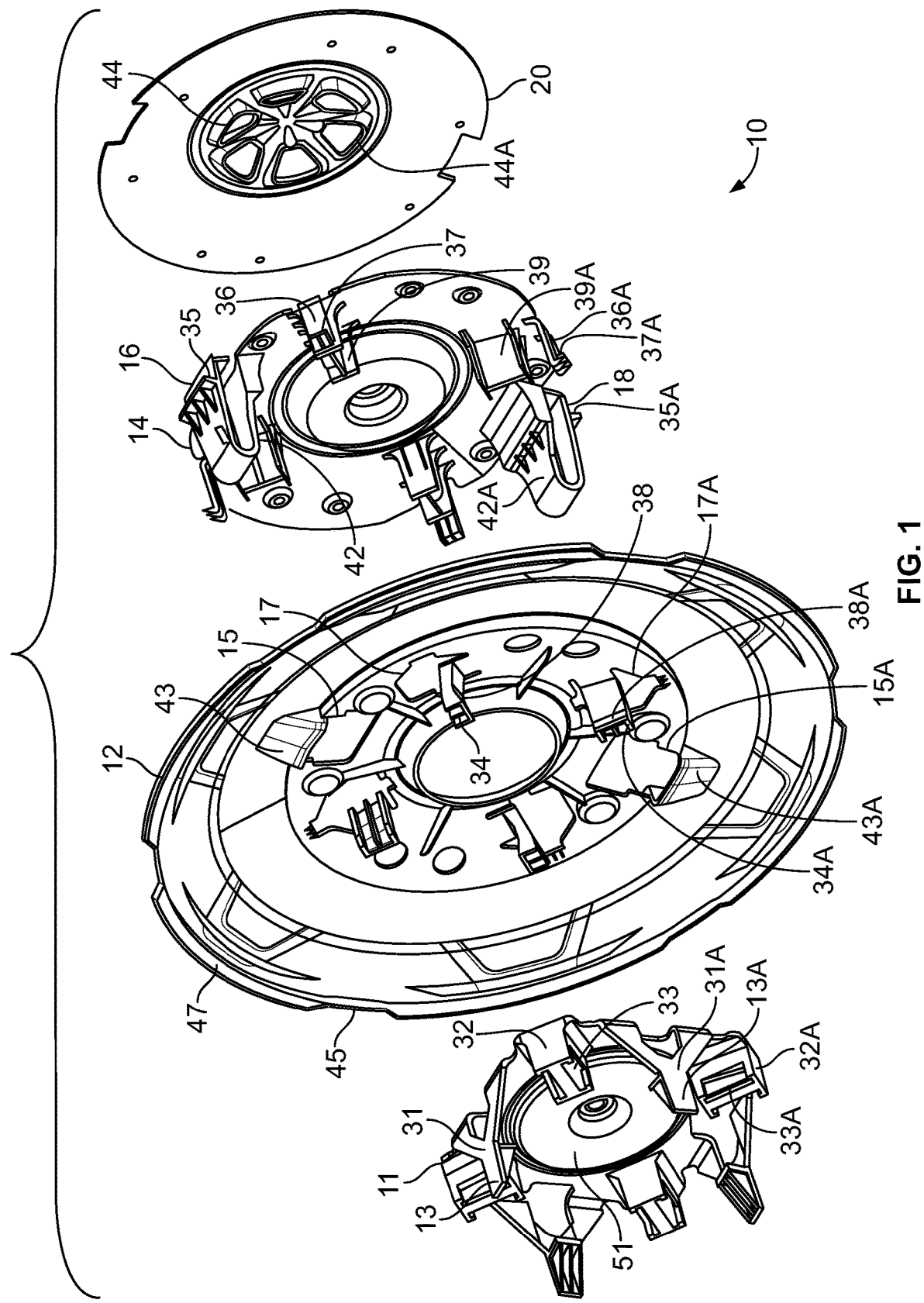
FIG. 1 is an exploded perspective view of components of a vehicle wheel cover assembly in accordance with an embodiment of the present invention.
Figure 2:
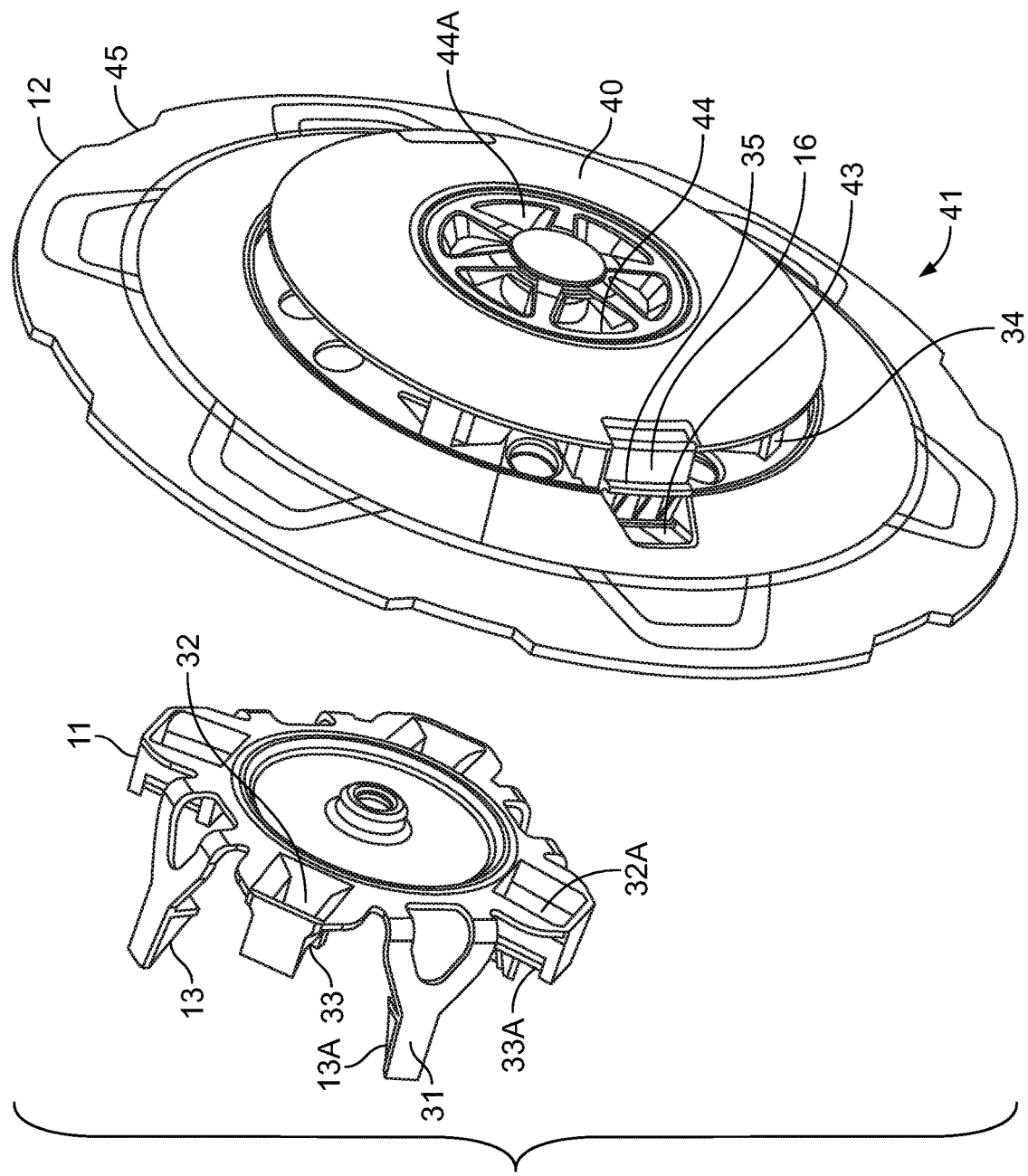
FIG. 2 is a perspective view of a partially assembled vehicle wheel cover assembly in accordance with an embodiment of the present invention.
Figure 3:
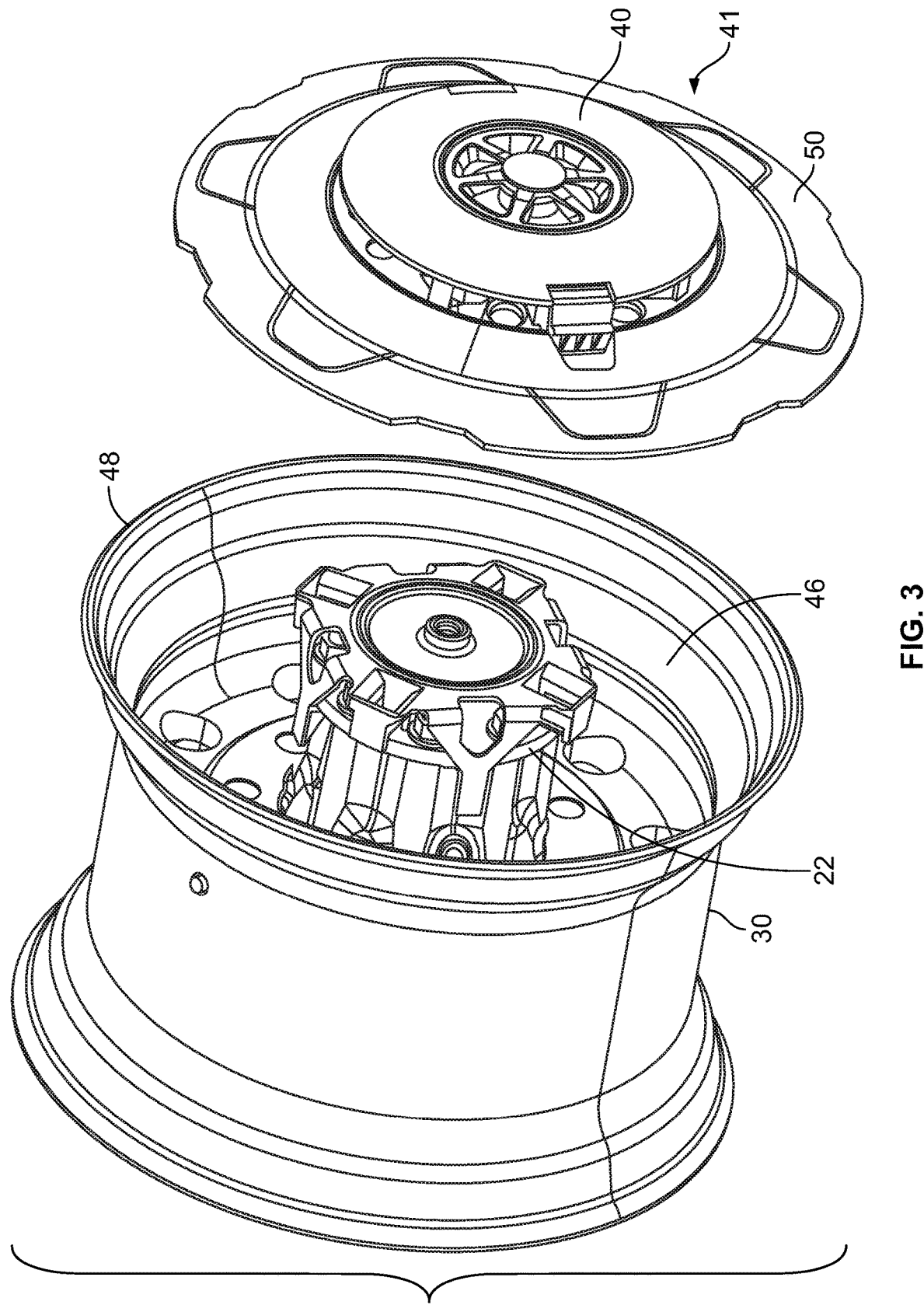
FIG. 3 is a perspective view of a partially assembled vehicle wheel cover assembly and wheel hub in accordance with an embodiment of the present invention.
Figure 4:
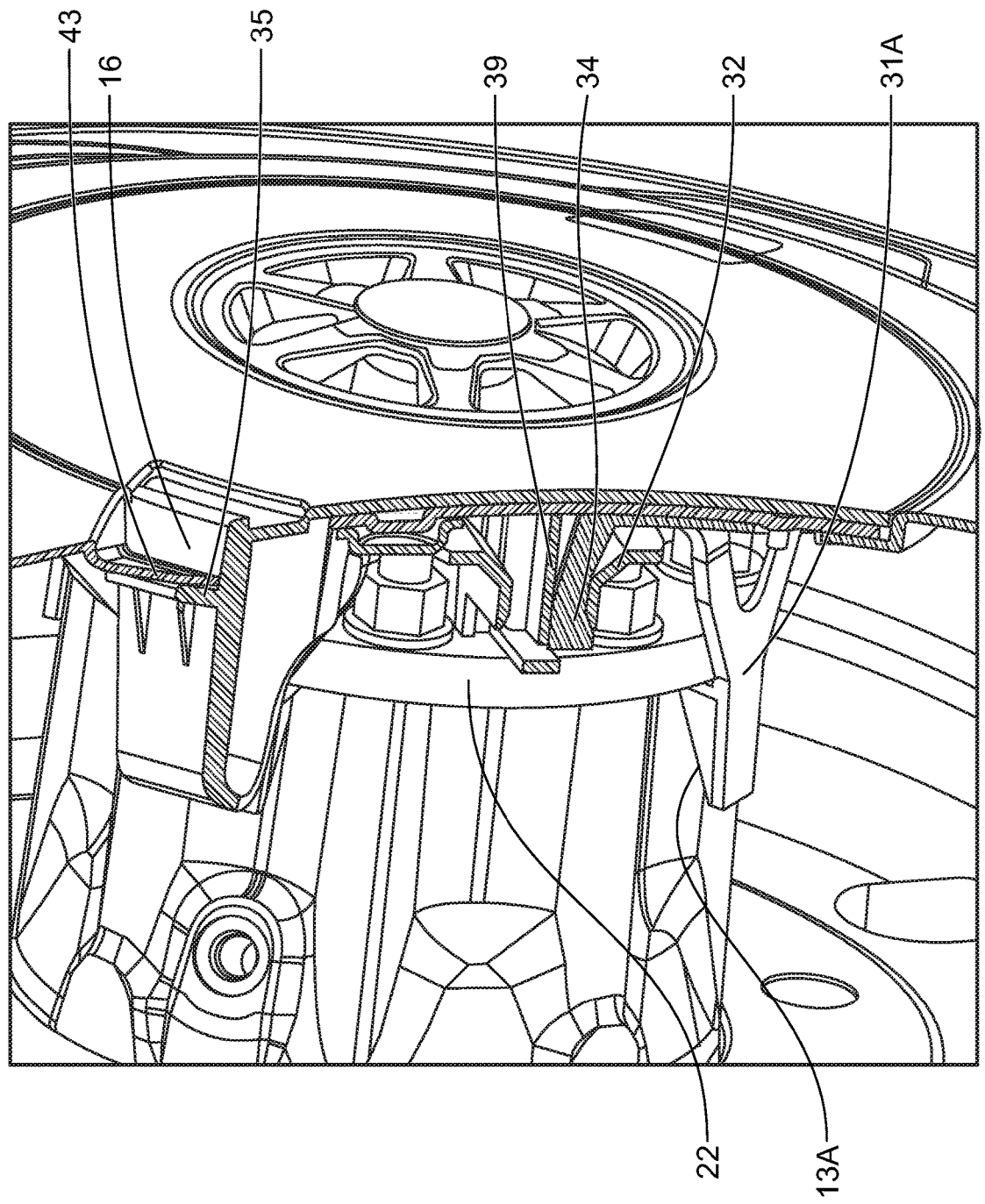
FIG. 4 is a partial view of the assembled vehicle wheel cover assembly and wheel hub in accordance with an embodiment of the present invention.

FIGS. 1-4 generally designate a commercial vehicle wheel cover 10. The cover 10 comprises a mounting ring 11, an outer wheel cover 12, an inner wheel cover latching cover 14 and an inner wheel cover 20. Mounting ring 11 is generally circular in shape with at least two mounting ring latches 13 and 13A extending radially inward from near the radial outer edge of mounting ring 11. Mounting ring 11 latches 13 and 13A include at least two radially outward locking faces 31 and 31A. Mounting ring 11 also includes at least two receiving cups 32 and 32A each having at least one receiving opening 33 and 33A. Outer wheel cover 12, is generally round and dome-shaped with first latch openings 15 and 15A and second latch openings 17 and 17A. Outer wheel cover 12 includes at least one wheel hub debris notch 45 to allow debris to exit the wheel hub well 46 as well as an outer periphery seal 47 preferably made from a thermoplastic elastomer to seal to a wheel rim 48. Outer wheel cover 12 also includes at least two latch disengagement recesses 43 and 43A. Outer wheel cover 12 also includes axially inwardly extending latches 34 and 34A Inner wheel latching cover 14 includes at least two axially outwardly extending first cover latches 16 and 18 extending from the outer axial edge of inner wheel latching cover 14. First cover latches 16 and 18 include radially outward locking faces 35 and 35A. Inner wheel latching cover 14 also has a plurality of second latches 36 and 36A including radially outwardly extending lips 37 and 37A. First cover latch 16 extends through first opening 15 in outer wheel cover 12 and first cover latch 18 extends through first opening 15A in outer wheel cover 12.

The outer wheel cover 12, the mounting ring 11, the inner wheel latching cover 14 and the inner wheel cover 20 can be made from a polymeric material by a molding process, or it can be made from a metallic material by a stamping process.

Wheel cover assembly 10 is comprised of a mounting ring 11, an outer wheel cover 12, an inner wheel latching cover 14 and an inner wheel cover 20. Wheel cover 20 includes a pair of thumb holes 44 and 44A to aid in wheel cover removal. Wheel cover assembly 10 has an axial outer side 50 and an axial inner side 51. Inner wheel cover 20 can be welded to inner wheel latching cover 14 by way of heat staking, welding or bonding, to form inner wheel structure 40. Inner wheel structure 40 is radially encapsulated to outer wheel cover 12 by second latches 36 and 36A engaging through outer wheel cover second openings 17 and 17A. The radially outwardly extending lips 37 and 37A prevent inner wheel structure 40 from axially detaching from outer wheel cover 12 during wheel cover removal. The inner wheel structure 40 and radially encapsulated outer wheel cover 12 form wheel disc structure 41.

The axial inner side 51 of the wheel cover assembly 10 is adjacent a tractor wheel hub 30. The wheel cover assembly 10 mounting ring 11 is attached to tractor wheel hub 30 by mounting ring 11 latches 13 and 13A, which latch over an axle flange 22 of the wheel hub 30 in an initial latching step. In the case of a trailer wheel hub (not shown), wheel mounting ring 11 can latch to a hub cap flange (not shown). Wheel mounting ring 11 has sufficient clearance to clear PSI inflation systems commonly used across trailer fleets.

Wheel disc structure 41 is positioned adjacent mounting ring 11. Wheel disc structure 41 axially inwardly extending latches 34 and 34A include radially shallow engagement lips 38 and 38A, which pass through mounting ring 11 receiving cups 32 and 32A and secure into receiving openings 33 and 33A in a first securing step.

Inner locking structure 40 is pushed axially toward wheel hub 30. Inner locking structure 40 includes a plurality of locking pins 39 and 39A that pass axially into retaining ring 11 receiving cups 32 and 32A, radially contacting inside the mounting ring receiving cups 32 and 32A and radially contacting the outer wheel cover 12 axially inwardly extending latches 34 and 34A. The locking pins 39 and 39A prevent wheel disc structure 41 shallow engagement lips 38 and 38A from exiting mounting ring 11 receiving cups 32 and 32A, thusly securing the wheel disc structure 41 to the mounting ring in a first locking step.

Inner locking structure 40 axially outwardly extending first cover latches 16 and 18 also include inward locking faces 42 and 42A. Inward locking faces 42 and 42A are brought into contact with mounting ring 11 latches 13 and 13A, by radially contacting mounting ring 11 radially outward locking faces 31 and 31A, thusly securing the mounting ring 14 to the wheel hub in a secondary securing step.

Inner locking structure 40 axially outwardly extending first cover latches 16 and 18 complete the wheel cover assembly 10 installation, when first cover latches 16 and 18 radially outward locking faces 35 and 35A latch inward of outer wheel cover 12 latch disengagement recesses 43 and 43A, thusly axially locking inner wheel structure 40 to outer wheel cover 12.

To remove the wheel disc structure 41 from the wheel hub 30, first cover latches 16 and 18 are pressed and held inwardly to disengage from latch disengagement recesses 43 and 43A and inner locking structure 40 is pulled axially away from wheel hub 30 by pulling through thumb holes 44 and 44A. Once inner locking structure 40 locking pins 39 and 39A withdraw from receiving cups 32 and 32A, wheel disc structure 41 is free to disengage from mounting ring 11, as radially shallow engagement lips 38 and 38A only create a light latching engagement with mounting ring 11 receiving openings 33 and 33A.

Mounting ring 11 and wheel disc structure 41 can be installed and removed from a wheel hub 30 in a tool-free operation by hand.

Skilled persons will realize that although in the exemplary embodiment shown, the inner locking structure moves axially inward to lock to the outer wheel cover and also locks to the mounting ring, it would be possible to use the outer wheel cover to lock the inner wheel latching cover in place. Skilled people will also notice that by manufacturing the wheel cover using the polymeric material with a molding process, all latches, features and locks described can all be molded-in, reducing manufacturing costs and be made flexible enough to easily engage and disengage when installing or removing, yet remain robustly and sturdily locked to a commercial vehicle wheel hub flange when in use.

What is claimed is:

1. A vehicle wheel cover assembly comprising:
   a mounting ring configured to connect to a flange of a wheel hub,
   an outer wheel cover having an axially inner surface for facing toward the wheel hub and an axially outer surface opposite the axially inner surface,
   an inner wheel locking structure carried on the outer wheel cover,
   locking portions of the mounting ring and the outer wheel cover having an unlocked configuration that permits the outer wheel cover and inner wheel locking structure carried thereon to be connected to the mounting ring and a locked configuration that secures the outer wheel cover and the inner wheel locking structure to the mounting ring,
   the inner wheel locking structure having an axially outward, unlocked position wherein the inner wheel locking structure permits the locking portions to shift from the unlocked to the locked configuration, and
   the inner wheel locking structure having an axially inward, locked position wherein the inner wheel locking structure fixes the locking portions of the mounting ring and the outer wheel cover in the locked configuration and secures the outer wheel cover and the inner wheel locking structure carried thereon to the mounting ring.

2. The vehicle wheel cover assembly of claim 1, wherein the mounting ring includes at least two latches that secure the mounting ring to a flange on a wheel hub.

3. The vehicle wheel cover assembly of claim 1 wherein the outer wheel cover includes at least two axially-inward-extending latches that pass through openings in the mounting ring to secure the outer wheel cover to the mounting ring.

4. The vehicle wheel cover assembly of claim 1, wherein the inner wheel locking structure includes at least two axially-outwardly-extending latches that pass through openings in the outer wheel cover to secure the locking structure to the outer wheel cover.

5. The vehicle wheel cover assembly of claim 1,
wherein the inner wheel locking structure includes at least two axially-outwardly-extending latches each having a lip,
wherein the outer wheel cover includes at least two indented sections along an opening of the inner wheel cover,
and wherein each of the axially-outwardly-extending latch lips is received in one of the outer wheel cover indented sections to secure the inner wheel locking structure to the outer wheel cover.

6. The vehicle wheel cover of claim 1,
wherein said mounting ring, inner wheel locking structure and outer cover is assembled to a vehicle hub in a tool free operation.

7. The vehicle wheel cover of claim 6,
wherein said mounting ring, inner wheel locking structure and outer cover is removable from a vehicle hub in a tool free operation.

8. The vehicle wheel cover assembly of claim 1,
wherein the outer wheel cover separates the inner wheel locking structure from the mounting ring.

9. The vehicle wheel cover assembly of claim 1,
wherein the locking portions of the mounting ring and the outer wheel cover include at least one latch and at least one surface for being engaged by the at least one latch.

10. The vehicle wheel cover assembly of claim 1,
wherein the locking portions of one of the mounting ring and the outer wheel cover include at least one latch,
wherein the other of the mounting ring and the outer wheel cover includes at least one opening sized to permit the at least one latch to be advanced into the at least one opening.

11. The vehicle wheel cover assembly of claim 1,
wherein the inner wheel locking structure and the outer wheel cover include stop surfaces that engage to limit axially outward movement of the inner wheel locking structure away from the outer wheel cover.

12. The vehicle wheel cover assembly of claim 1,
wherein the locking portions of the mounting ring and the outer wheel cover in the unlocked configuration permit the outer wheel cover and inner wheel locking structure carried thereon to be removed from the mounting ring.

13. A vehicle wheel cover assembly comprising:
a mounting ring having a primary surface configured to contact an axially outer surface of a flange of a wheel hub,
an outer wheel cover, and
an inner wheel locking structure secured to the outer wheel cover,
wherein the mounting ring includes at least two latches that secure the mounting ring to the flange of the wheel hub,
the latches of the mounting ring including radially inwardly extending barbs having secondary surfaces configured to contact an axially inner surface of the wheel hub flange and retain the wheel hub flange between the primary and secondary surfaces of the mounting ring,
wherein the outer wheel cover includes at least one axially inward extending latch configured to extend into at least one opening of the mounting ring,
the inner wheel locking structure having an axially outward, unlocked position wherein the inner wheel locking structure permits the at least one axially inward extending latch of the outer wheel cover to extend into the at least one opening of the mounting ring, and
the inner wheel locking structure having an axially inward position wherein the inner wheel locking structure locks the at least one axially inward extending latch of the outer wheel cover to the mounting ring to secure the outer wheel cover to the mounting ring.

14. The vehicle wheel cover assembly of claim 13,
wherein the inner wheel locking structure includes at least two axially inwardly extending latches configured to extend into openings in the outer wheel cover to secure the outer wheel cover to the mounting ring.

15. The vehicle wheel cover assembly of claim 13,
wherein the inner wheel locking cover structure includes at least two axially outwardly extending latches each having a lip,
wherein the outer wheel cover includes at least two indented sections along an opening of the outer wheel cover, and
wherein each of the inner wheel locking structure axially outwardly extending latch lips is received in one of the outer wheel cover indented sections to secure the outer wheel cover to the inner wheel locking structure.

16. The vehicle wheel cover assembly of claim 13,
wherein the at least one axially inward extending latch of the outer wheel cover includes a plurality of axially inward extending latches, and
wherein the at least one opening of the mounting ring includes a plurality of openings.

17. The vehicle wheel cover assembly of claim 13,
wherein the inner wheel locking structure includes at least two latches that pass through openings in the outer wheel cover to secure the locking structure to the outer wheel cover.

18. A vehicle wheel cover comprising:
a mount having a primary surface configured to contact an axially outer surface of an annular flange of a wheel hub;
latches of the mount having radially inwardly extending barbs having secondary surfaces configured to contact an axially inner surface of the wheel hub and retain the wheel hub flange between the primary and secondary surfaces of the mount;
an outer wheel cover having an axially inner surface for facing the wheel hub and an axially outer surface opposite the axially inner surface;
an inner wheel locking structure carried on the outer wheel cover;
at least one latch of the outer wheel cover having an unlocked position that permits the outer wheel cover and inner wheel locking structure carried thereon to be connected to or removed from the mount and a locked position that secures the outer wheel cover and inner wheel locking structure carried thereon to the mount;
the inner wheel locking structure being shiftable from an axially outer, unlocked position to an axially inner, locked position to fix the at least one latch of the outer wheel cover in the locked position and secure the outer wheel cover and inner wheel locking structure to the mount.

19. The vehicle wheel cover of claim 18 wherein the inner wheel locking structure includes at least one latch extending through at least one opening of the outer wheel cover.

* * * * *